(12) United States Patent
Luppi et al.

(10) Patent No.: US 10,018,285 B2
(45) Date of Patent: Jul. 10, 2018

(54) METHOD FOR CONNECTING A BOTTOM PIPE AND A RISER PIPE

(71) Applicant: TECHNIP FRANCE, Courbevoie (FR)

(72) Inventors: Ange Luppi, Nîmes (FR); Cédric Madaschi, Gajan (FR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 15/309,116

(22) PCT Filed: May 4, 2015

(86) PCT No.: PCT/FR2015/051183
§ 371 (c)(1),
(2) Date: Nov. 4, 2016

(87) PCT Pub. No.: WO2015/170046
PCT Pub. Date: Nov. 12, 2015

(65) Prior Publication Data
US 2017/0074426 A1  Mar. 16, 2017

(30) Foreign Application Priority Data
May 7, 2014  (FR) ..................................... 14 54131

(51) Int. Cl.
*F16L 1/26* (2006.01)
*E21B 17/08* (2006.01)
(Continued)

(52) U.S. Cl.
CPC .............. *F16L 1/26* (2013.01); *E21B 17/085* (2013.01); *E21B 43/0107* (2013.01); *F16L 1/15* (2013.01)

(58) Field of Classification Search
CPC combination set(s) only.
See application file for complete search history.

(56) References Cited

U.S. PATENT DOCUMENTS

| 3,299,950 A | 1/1967 | Shatto, Jr. |
| 2010/0186963 A1* | 7/2010 | Butcher .............. E21B 43/0107 166/341 |
| 2012/0292040 A1* | 11/2012 | Prescott .................. E21B 17/01 166/345 |

FOREIGN PATENT DOCUMENTS

| EP | 1 395 731 | 11/2005 |
| FR | 2 588 926 A1 | 4/1987 |
| FR | 2 928 987 A1 | 9/2009 |

OTHER PUBLICATIONS

International Search Report dated Aug. 12, 2015 issued in corresponding International patent application No. PCT/FR2015/051183.
(Continued)

*Primary Examiner* — Sean D Andrish
(74) *Attorney, Agent, or Firm* — Ostrolenk Faber LLP (57) ABSTRACT

A facility and a method for connecting a bottom submarine pipe (14) and a riser submarine pipe. The riser submarine pipe has an upstream end (62) with a fitting (66) on the end thereof, while the bottom submarine pipe (14) has a downstream end (46) provided with a connecting end piece (50). The method includes the following steps: a) an anchoring support (38) is supplied; b) the upstream end (62) and the downstream end (46) are held, while the fitting (66) extends facing the connecting end piece (50); and c) the fitting (66) and the connecting end piece (50) are brought towards each other for connection. The fitting (66) of the upstream end (62) is held still in relation to the anchoring support (38), and the connecting end piece (50) is moved towards the fitting (66).

12 Claims, 5 Drawing Sheets

(51) Int. Cl.
*E21B 43/01* (2006.01)
*F16L 1/15* (2006.01)

(56) References Cited

OTHER PUBLICATIONS

Written Opinion dated Aug. 12, 2015 issued in corresponding International patent application No. PCT/FR2015/051183.

\* cited by examiner

METHOD FOR CONNECTING A BOTTOM PIPE AND A RISER PIPE

CROSS-REFERENCE TO RELATED APPLICATIONS

The present application is a 35 U.S.C. §§ 371 national phase conversion of PCT/FR2015/051183, filed May 4, 2015, which claims priority of French Patent Application No. 1454131, filed May 7, 2014, the contents of which are incorporated by reference herein. The PCT International Application was published in the French language.

TECHNICAL FIELD

The present invention relates to a method for connecting an underwater pipe stretched out on a sea bed and an underwater riser, and to a facility for implementing the method.

One envisioned field of application is that of the transportation of hydrocarbons in an offshore environment.

BACKGROUND OF THE INVENTION

Known facilities comprise a bottom pipe more commonly known as a flow-line pipe, and an underwater riser pipe, often also referred to as a riser, for conveying the hydrocarbon from the sea bed where it leaves the flow-line pipe to the surface situated vertically above the sea bed.

Hydrocarbons are extracted from increasingly deep sea beds, on the one hand, and the underwater operating facilities are complex and require the use of a plurality of flow-line pipes and risers, on the other. These risers are also commonly referred to as hybrid towers. The difficulties lie in installing these underwater pipes from the surface. In particular, through this dense array of pipes it is awkward to connect a flow-line pipe with a riser.

Thus, the facility described in document EP 1 395 731 B, whereby the riser and the flow-line pipe are preconnected and transported thus as far as the installation site, is inappropriate because the riser/flow-line pipe assembly is submerged and then the riser is raised. It is therefore awkward to implement this method when other pipes are already in place, as these may become snagged during maneuvers.

Hence the idea has been developed of making the connection between the flow-line pipe and the riser in situ on the sea bed using underwater robots and inspection facilities that can be operated from the surface. Thus document FR 2 790 054 discloses a connection method and a facility for implementing it comprising an anchoring support installed on the sea bed and, in a first phase, an upstream end of the riser and a downstream end of the flow-line pipe are held through the anchoring support. The upstream end is equipped with a connector while the downstream end is equipped with a connection end piece. The connector and the connection end piece are then oriented toward one another in a direction extending vertically from the sea bed toward the surface. Next, to make the connection, the upstream end of the riser and the connector are driven translationally toward the connection end piece of the flow-line pipe so that the two pipes can be connected. Such a method of connection entails driving the connector translationally toward the connection end piece while at the same time controlling the vertical movement of the riser. In order to achieve this, a hauling cable is also used. However, the risks of the connector impacting on the elements of the anchoring support and of the connection end piece are high, given the masses that are thus being made to move.

SUMMARY OF THE INVENTION

One problem that arises and that the present invention seeks to solve is therefore that of proposing a connection method which is easier, and for which the risks of impact between the connection end piece and the connector are lower.

To this end, and according to a first subject, the invention proposes a method for connecting an underwater flow-line pipe stretched out on a sea bed for transporting a hydrocarbon and an underwater riser oriented toward a sea surface situated vertically above the sea bed. The underwater riser has an upstream end ending in a connector extending near the sea bed. The underwater flow-line pipe has a downstream end equipped with a connection end piece. The method comprising the following steps: a) an anchoring support is supplied and the anchoring support is installed on the sea bed; b) the upstream end and the downstream end are held via the anchoring support so that the connection end piece extends in a position oriented in a direction away from the sea bed and the connector extends facing the connection end piece; and, c) then the upstream end is held in a fixed position with respect to said anchoring support, and the connection end piece is driven in a motion toward the connector so that the connection end piece and the connector are connected to each other.

Thus, one feature of the invention lies in the way in which the connector on the upstream end and the connection end piece are used for connecting the one to the other. It is no longer the connection end piece that is held in a fixed position and the connector of the upstream end that is driven toward it, but is the reverse, wherein the connection end piece is driven translationally while the connector is held in a fixed position so that these can be connected to one another. In that way, the coming-together of the connection end piece with the connector can be achieved with little or no impact because, in order to perform this operation, the loadings due to gravity which are exerted on the connection end piece needs to be overcome. In earlier practice, in which the connector is driven toward the connection end piece precisely, by letting go of the riser which, under the effect of gravity, may accelerate and give rise to a heavy impact.

By virtue of the connecting method according to the invention, it is possible to connect the underwater flow-line pipe and the underwater riser together in a relatively small space, which proves to be an advantage in a relatively dense and crowded environment where numerous pipes need to be connected to one another.

According to one particularly advantageous implementation of the invention, the downstream end of the underwater flow-line pipe is flexible. Thus, the flow-line pipe comprises successive layers of metal wire wound with a short pitch and with a long pitch and at least one sealing sheath for containing the hydrocarbon. As a result, it is easy to handle the connection end piece which extends it because the downstream end is able to flex in all directions.

Advantageously, between step a) and step b) the connection end piece is guided through the anchoring support so that the connection end piece can be brought into the position oriented in a direction away from the sea bed. In that way, because the upstream end of the riser is secured to the anchoring support, guiding the connection end piece through the anchoring support itself allows the one to be positioned perfectly with respect to the other, thereby avoiding the risks of impact.

For preference, the connection end piece is guided through the anchoring support in an oblique direction between a position distant from the sea bed and a position close to the sea bed in which position the connection end piece extends in the position oriented in a direction away from the sea bed. Such guidance may be performed under the action of gravity, by using suitable guide members, as will be explained hereinbelow.

According to one preferred alternative form of embodiment, pressure is applied to the anchoring support so as to be able to drive the connection end piece in motion toward the connector. In order to achieve that, use is made of extensible means which make it possible to combat the effects of gravity on the connection end piece without the risk of impacting the moving parts.

According to another object, the present invention proposes a connection facility for connecting an underwater flow-line pipe stretched out on a sea bed for transporting a hydrocarbon and an underwater riser oriented toward a sea surface situated vertically above the sea bed. The underwater riser having an upstream end ending in a connector extends near the sea bed, whereas the underwater flow-line pipe has a downstream end equipped with a connection end piece, the facility comprises an anchoring support intended to be installed on the sea bed so as to be able to hold the upstream end and the downstream end, whereas the connection end piece extends in a position oriented away from the sea bed and the connector extends facing the connection end piece. The facility further comprises a drive device configured and connected to drive the connector and the connection end piece translationally toward one another so that they can be connected to one another. A holding member for holding the connector in a fixed position with respect to the anchoring support, and in that the drive device is able to cause the connection end piece to be driven in motion toward the connector.

Thus, such an installation makes it possible to implement the connection method described hereinabove with the ensuing advantages. Furthermore, the downstream end of the underwater flow-line pipe is flexible. In that way, as indicated hereinabove, the moving of the connection end piece becomes easier.

Furthermore, the anchoring support comprises a receiving frame to receive the connection end piece pressing against it. Thus, the receiving frame is able to accommodate the connection end piece in a first phase of implementation so that this connection can be achieved thereafter. Also, the reception frame advantageously comprises guide members for guiding the connection end piece towards the position oriented in a direction away from the sea bed. As will be explained in greater detail later, the guide members make it possible to form a ramp for the connection end piece which is driven under the action of its own self-weight.

According to one particularly advantageous embodiment of the invention, the guide members are retractable. Thus, after the connection has been performed, the guide members are retracted and thus free up space around the anchoring support. It is then easier to connect another flow-line pipe and another riser in the same environment.

For preference, the drive device is mounted on the guide members. Thus, it is easy also to retract it with the guide members. Furthermore, the drive device advantageously comprises hydraulic cylinders. These can, for example, be operated by means of an underwater robot.

Other specifics and advantages of the invention will become apparent from reading the description given hereinafter of embodiments of the invention, which is given by way of entirely nonlimiting indication with reference to the attached drawings in which:

DESCRIPTION OF THE EMBODIMENTS

Figure 1:
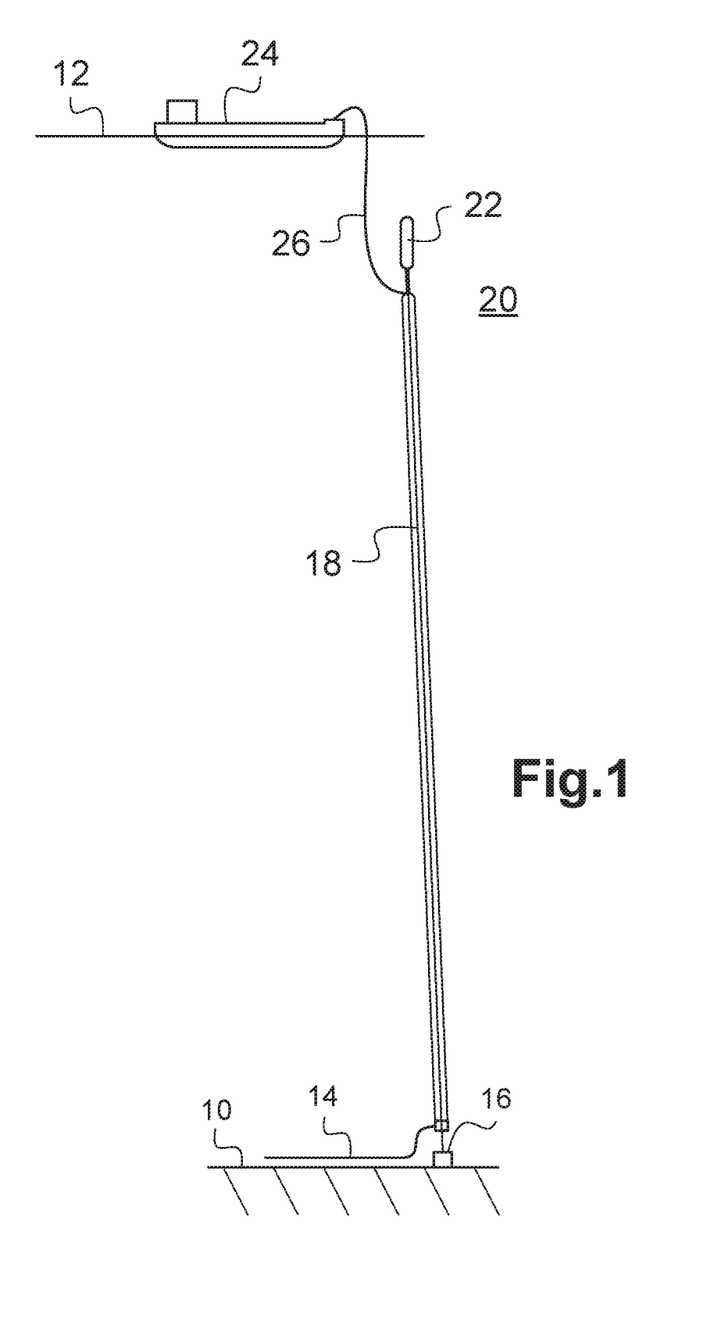
FIG. 1 is a schematic view illustrating the context of the invention in general.

FIG. 1 schematically illustrates a head of water, for example of 1500 m between the sea bed 10 and a surface 12. A bottom underwater pipe or flow-line pipe 14 extends along the sea bed 10. It arrives at an anchoring zone 16 and may come directly from an underwater facility, not depicted, or alternatively from a well capable of delivering a hydrocarbon. From the anchor zone 16 and toward the surface 12 there extends, substantially vertically, an underwater riser 18 extending as far as a subsurface zone 20 situated below the surface 12 and in which it is held by a float 22. Vertically above this and at the surface 12 there floats a surface vessel 24 connected to the underwater riser 18 by means of a flexible pipe 26. In that way, hydrocarbon flowing along inside the underwater flow-line pipe 14 may be conveyed as far as the surface vessel 24 via the underwater riser 18 and the flexible pipe 26.

Just one underwater flow-line pipe 14 is depicted in FIG. 1 and this is connected to just one underwater riser 18, and so the inherent difficulty in connecting these together is lower by comparison with situations in which the matter is one of connecting one of a plurality of underwater flow-line pipes and a plurality of underwater risers. A connection method and a facility for implementing same, according to the invention, so as to make the connecting of the underwater flow-line pipe and of the underwater riser easier regardless of the number of pipes will be set out hereinbelow.

Figure 2:
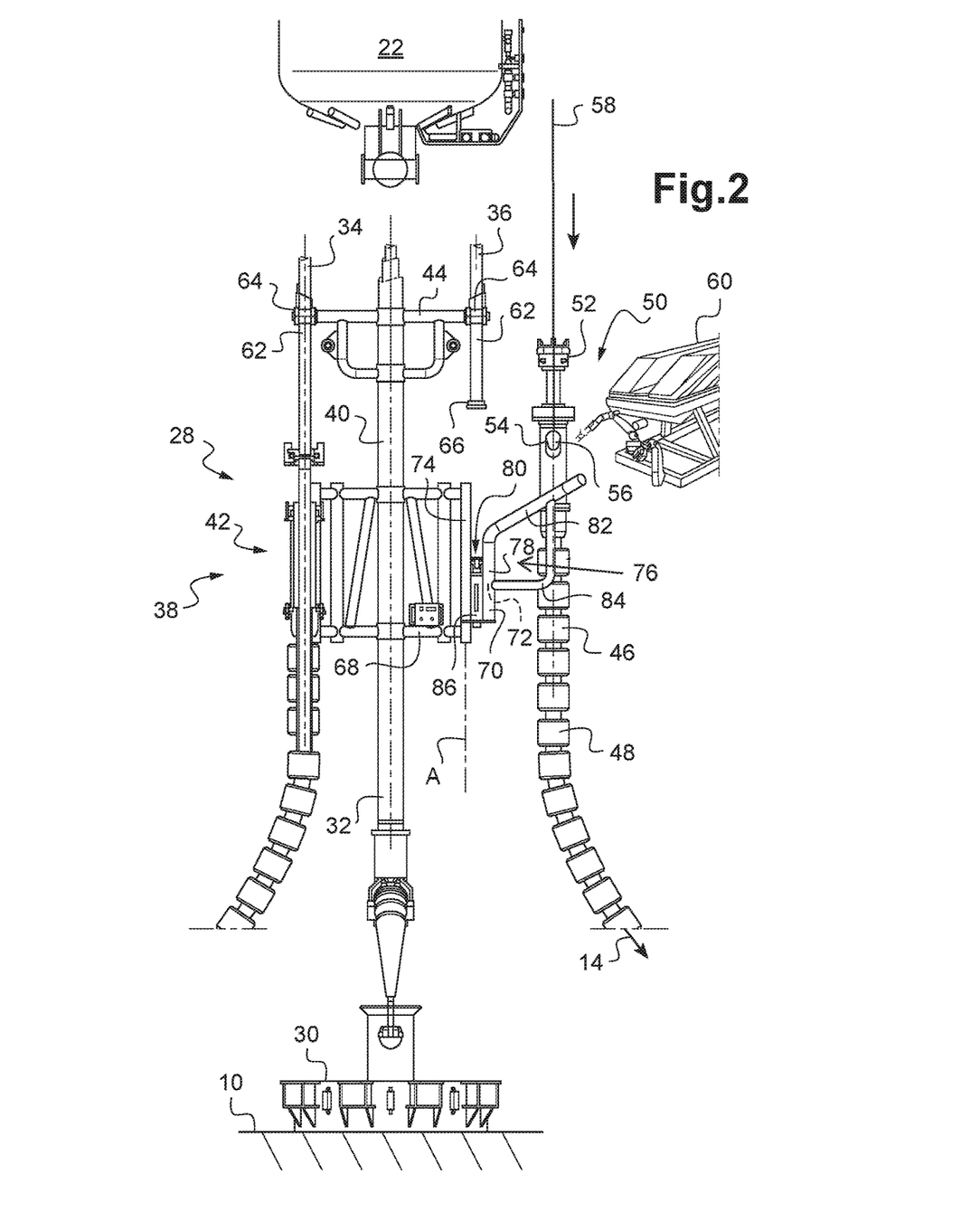
FIG. 2 is a schematic detail view showing a side elevation of the essential elements of the invention in a first phase of erection and according to a first alternative form of embodiment.

FIG. 2 illustrates a connection facility 28 according to the invention. This figure again shows the sea bed 10 in which a foundation 30 is made. Moored to this foundation is an anchoring line 32 which extends longitudinally toward the surface as far as the float 22 depicted schematically here, to show that it allows this anchoring line 32 to be kept under vertical tension. This anchoring line 32 may itself at its center be equipped with a pipe to form the riser or may be combined with secondary pipes 34, 36 running along it. The assembly then constitutes a hybrid tower. In this particular instance, two secondary pipes 34, 36 are depicted here.

The connection facility 28 comprises an anchoring support 38 itself comprising a lower part 40 of the anchoring line 32, on which a receiving frame 42 is installed rigidly near the sea bed 10 and, vertically above this, a holding frame 44.

Furthermore, FIG. 2 illustrates a downstream end 46 of the underwater flow-line pipe 14, which end 46 is flexible and equipped with buoys 48 making it easier to move in the water. Thus, the end 46 comprises layers of metal wire successively wound at short pitches and at long pitches and at least one sealing sheath to contain the hydrocarbon. It is the extension of a flexible flow-line pipe or alternatively of any other bottom installation.

The downstream end 46 of the underwater flow-line pipe 14 is equipped with a connection end piece 50 extended by an automatic connection device 52. The connection end piece 50 is itself equipped with two diametrically opposed lugs, one of them, 54, at the front of the figure, and the other, 56, at the rear of the figure. The connection end piece 50 is thus held suspended substantially vertically above the sea bed 10 by means of a sling 58 controlled from the surface. It may also be manipulated by means of an underwater robot 60 which notably allows the connections to be improved.

The secondary pipes 34, 36 each have an upstream end 62 held in a fixed position through the holding frame 44 by means of a clamp 64. The holding frame 44 consists of a rigid all-welded structure. We will take this opportunity to describe one of the secondary pipes 36, the upstream end 62 of which is ended with a connector 66. It will be seen that the upstream end 62 of the secondary pipe 36, constituting the riser, is held in a fixed position substantially parallel to the anchor line 32 and some distance therefrom, the connection being oriented toward the sea bed 10.

The receiving frame 42 situated vertically below the holding frame 44 has a purpose to guide the connection end piece 50 along the axis of and facing the connector 66, as will be explained hereinbelow. Just like the holding frame 44, the receiving frame 42 is an all-welded structure. It has a first part 68 forming a spacer and secured to the anchor line 32 and a pair of retractable second parts 70, 72 which are mounted to rotate about an axis A parallel to the anchor line 32.

The second parts, 70, 72, which form guide members, each have a longitudinal first element 74 which extends along the axis of rotation A, and a second element 76 having a first portion 78 extending longitudinally facing the longitudinal first element 74 and forming a gap 80, and a second portion 82 extending in the continuation of the first portion 78 and diverging in a rectilinear manner from the longitudinal first element 74. For example, the second portion 82 makes with the axis of rotation A an angle of between 70° and 50°. The second portion 82 is intended to form a ramp and extends over a distance greater than the height of the first portion 78. The first portion 78 and the second portion 82 are stiffened relative to one another by means of a bent third portion 84 that connects them.

In a service position, the second parts 70, 72 are adjusted parallel to one another. Thus, their longitudinal first elements 74 and their second element 76, as much as the first portion 78 as the second portion 82, are respectively situated at equal distances and substantially parallel.

It will furthermore be noted that the gap 80 is situated substantially along the axis of the upstream end 62 of the secondary pipe 36. More specifically, the axis of the upstream end 62 extends parallel to and equidistant from the two gaps 80 of the second retractable parts 70, 72.

In addition, each of the two gaps 80 is equipped with a hydraulic cylinder 86 extending parallel between the first portion 78 of the second element 76 and the longitudinal first element 74 itself. The hydraulic cylinder 86, depicted in the retracted position, extends over a height substantially less than the length of the first portion 78 of the second element 76.

Figure 3:
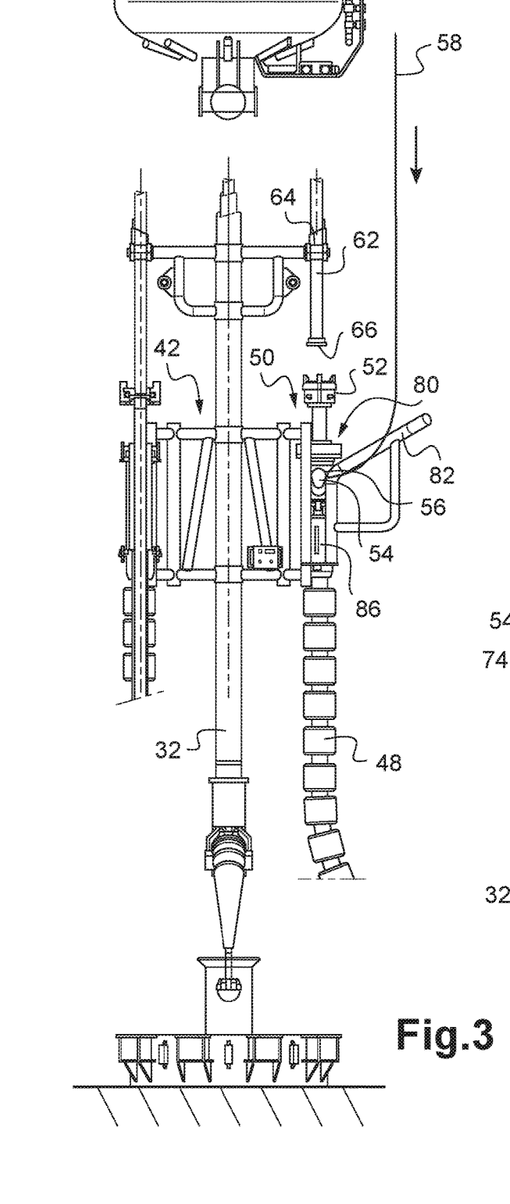
FIG. 3 is a schematic side elevation illustrating the essential elements of the invention as depicted in FIG. 2, in a second phase.

Reference is made to FIG. 3 which depicts all the elements of FIG. 2. In order to arrive at the relative position of the elements depicted in FIG. 3, readopting the relative position thereof in FIG. 2, the sling 58 has been progressively released so that under the effect of its own self-weight the connection end piece 50, already partially engaged between the two second portions 82 of the second element 76, presses against these two second portions 82 via its two diametrically opposed lugs 54, 56. By pressing against the two portions 82 on their free-end side, the lugs 54, 56 are guided in translation respectively toward the gaps 80. The two portions 82 thus form ramps for these two lugs 54, 56. Thus in FIG. 3, we find the sling 58 released, whereas the lugs 54, 56 are situated inside the gaps 80 and respectively bearing against the ends of the hydraulic cylinders 86. Thus, the connection end piece 50 is fully supported by the receiving frame 42, on the axis of the upstream end 62 of the secondary pipe 36, and facing its connector 66.

Figure 4:
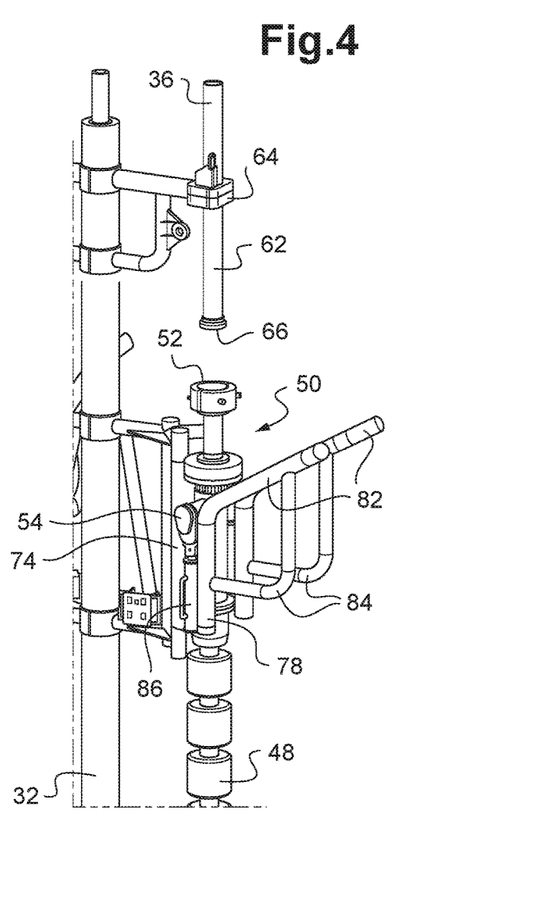
FIG. 4 is a schematic perspective view of the elements illustrated in FIG. 3.

FIG. 4 is a perspective illustration of the connection end piece 50 in the position that it occupies in FIG. 3. Once again we find the hydraulic cylinder 86 extending between the first portion 78 and the longitudinal first element 74. We also again see the lug 54 housed in the gap 80 pressing longitudinally against the hydraulic cylinder 86. Of course, the other lug 56, hidden here, is pressing against the other hydraulic cylinder 86.

Figure 5:
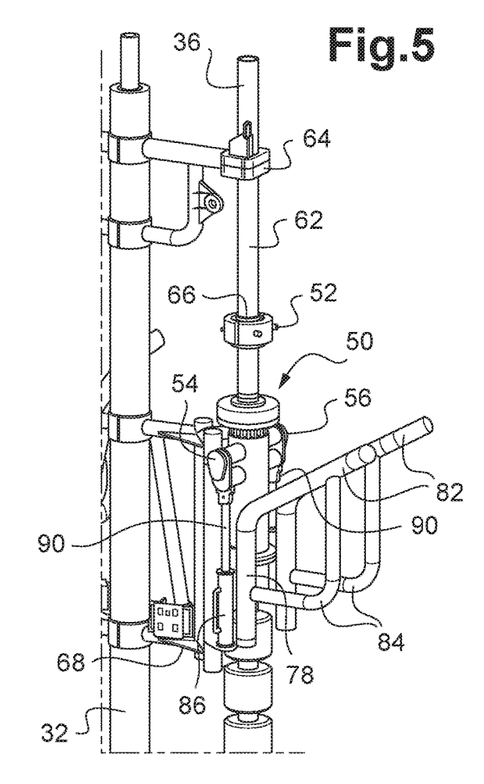
FIG. 5 is a schematic perspective view of the elements depicted in FIG. 4 in a third phase.

Starting from this position, the hydraulic cylinders will then be actuated, as shown in FIG. 5, for example, via the underwater robot illustrated in FIG. 2, and the connection end piece 50 will then be driven translationally toward the connector 66 of the upstream end 62 of the secondary pipe 36. The rod 90 of the hydraulic cylinders 86 will then apply force to the lugs 54, 56. The automatic connection device 52 will therefore come into contact with the connector 66 oriented to face it, and the connection between the connection end piece 50 and the upstream end 62 will then occur automatically. It will be appreciated that the forces of impact between the connection end piece 50 and the upstream end 62 are in a completely different category to those that may be caused by the downward movement of a riser in a downward-movement operation for making a connection. Thanks to the method according to the invention, the forces of contact between the connector 66 and the automatic connection device 52 are fully controlled and are far lower. Also, the risks of damage, at the time of such contact, are infinitely lower.

Figure 6:
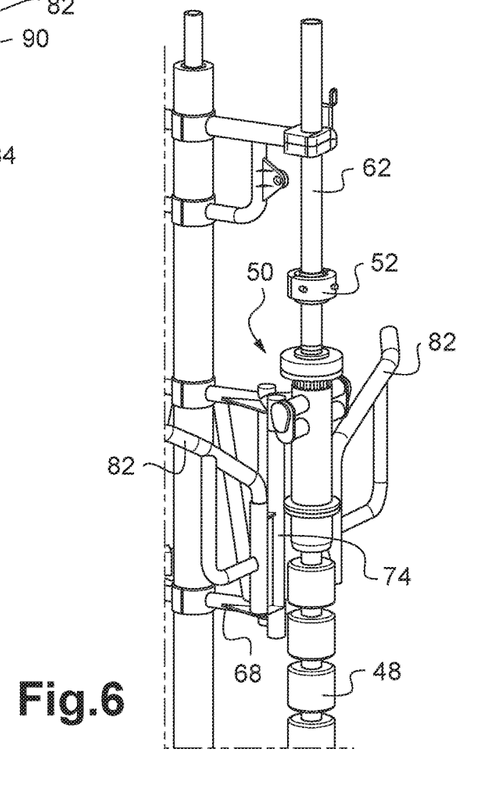
FIG. 6 is a schematic perspective view of the elements depicted in FIG. 5 in a final phase.

From this position as depicted in FIG. 5, the rods 90 of the hydraulic cylinders 86 are retracted and the connection end piece 50 is then completely secured to the upstream end 62 by virtue of the automatic connection device 52 and the connector 66. Thus, the connection end piece 50 and the downstream end 48 of the underwater flow-line pipe 14 that extends it are suspended from the upstream end 62. After the rods 90 of the hydraulic cylinders 86 have been retracted, the second parts 70, 72 of the receiving frame 42 are then folded back in two opposite directions from one another toward the spacer-forming first part 68 so as to be retracted, as illustrated in FIG. 6. They thus pivot about their respective longitudinal first element 74.

Thus retracted, the second parts 70, 72 of the receiving frame 42 present no risk of impeding any additional connection of another flow-line pipe.

Figures 7, 8, 9:
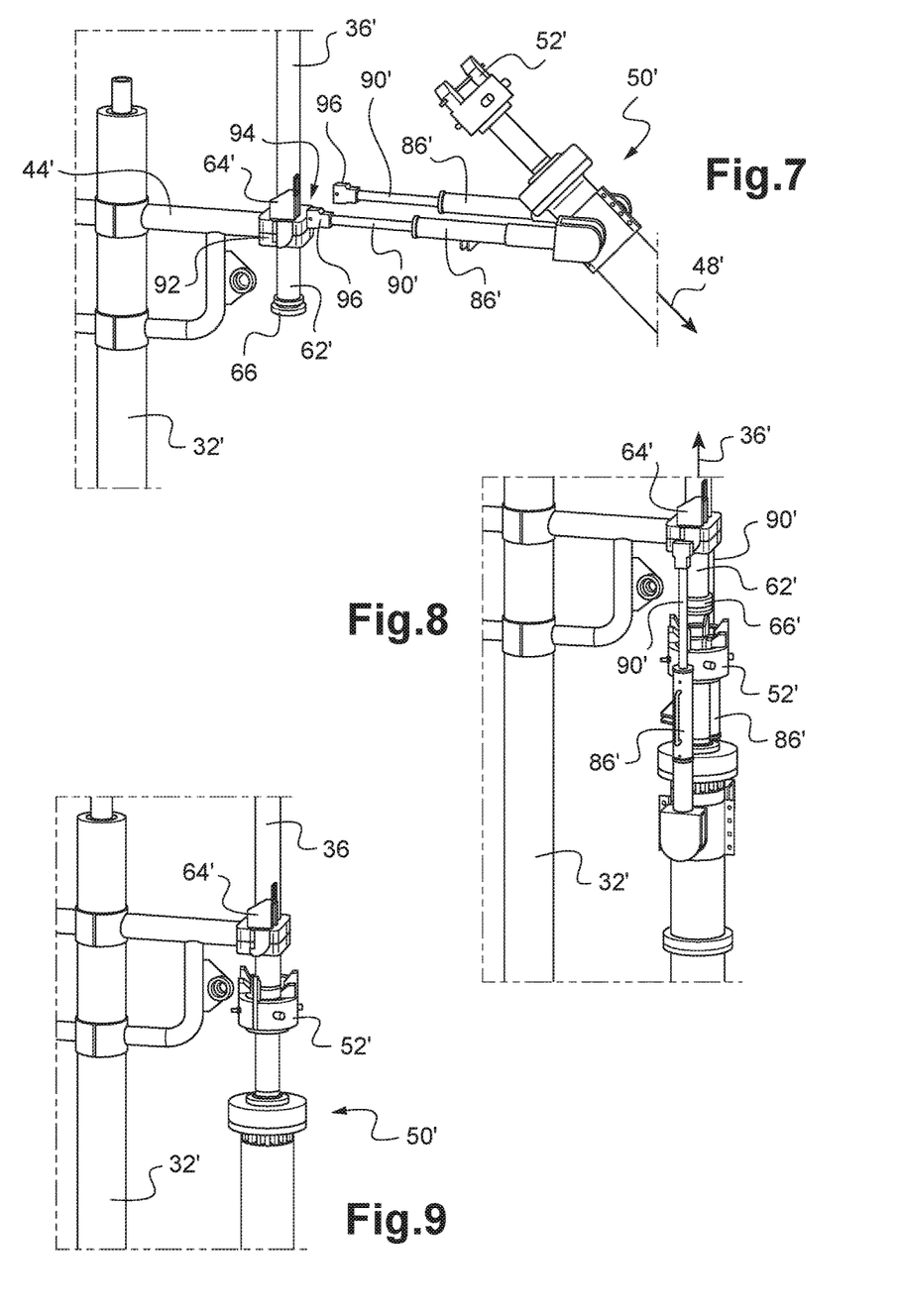
FIG. 7 is a schematic perspective view of the essential elements of the invention according to a second alternative form of embodiment according to a first phase of erection corresponding to that of FIG. 2.
FIG. 8 is a schematic perspective view of the elements of the invention depicted in FIG. 7 according to a second phase corresponding to that of FIG. 4.
FIG. 9 is a schematic perspective view of the elements of the invention depicted in FIG. 8 according to a final phase.

Reference will now be made to FIGS. 7 to 9 in order to describe the invention according to a second alternative form of embodiment.

The elements of this alternative form that perform the same functions as those of the elements of the first alternative form depicted in FIGS. 2 to 6 will bear the same reference number followed by a prime "'" suffix. By contrast, elements that are new in terms of their functions will take a reference number that follows on from the series of references already assigned.

Thus, FIG. 7 partially again shows an anchor line 32' and a holding frame 44' to which an upstream end 62' of a secondary pipe 36' is held in a fixed position by means of a clamp 64'. The latter is equipped here with two catching surfaces 92, 94 diametrically opposite one another with respect to an upstream end 62' of the secondary pipe 36'.

Also, the connection end piece 50' of the downstream end 48' of the flow-line pipe, not depicted, is itself equipped with two hydraulic cylinders 86' which are parallel and mounted in an articulated manner in two diametrically opposite points. These points correspond to the locations of the lugs 54, 56 of the connection end piece 50 described with reference to the first alternative form of embodiment. The rods 90' of the hydraulic cylinders 86' are extended beforehand and their ends are respectively equipped with two catching members 96. Using the underwater robot 60, not depicted here, the two catching members 96 are respectively engaged over the two catching surfaces 92, 94 of the clamp 64'. The connection end piece 50' is then released and is then suspended from the clamp 64' along the axis of the upstream end 62' of the pipe 36'. In this position, as depicted in FIG. 8, the rods 90' of the hydraulic cylinders 86' are then retracted and, as a result, the automatic connection device 52' comes to collaborate with the connector 66' to connect the one to the other.

FIG. 9 again shows the connection end piece 50' thus connected to the upstream end 62' of the secondary riser 36', and rid of the hydraulic cylinders 86'. Thus, just like in the preceding alternative form of embodiment, the coming-together of the automatic connection device 52' with the connector 66' can be achieved without impact and, therefore, allows the integrity of these to be preserved.

The invention claimed is:

1. A method for connecting an underwater flow-line pipe stretched out on a sea bed for transporting a hydrocarbon and an underwater riser oriented toward a sea surface situated vertically above the sea bed, the underwater riser having an upstream end ending in a connector and the underwater flow-line pipe having a downstream end equipped with a connection end piece, the method comprising:
  a) supplying an anchoring support and installing the anchoring support on the sea bed;
  b) holding the upstream end of the riser and the downstream end of the flow-line pipe via the anchoring support, so that the connection end piece extends in a position oriented in a direction away from the sea bed and the connector faces the connection end piece; and
  c) holding the connector of the upstream end in a fixed position with respect to the anchoring support, and driving the connection end piece in a translational motion toward the connector to connect the connection end piece and the connector to each other,
  a holding member directly holding the upstream end so that the connector of the upstream end is in a fixed position with respect to the anchoring support.

2. The connecting method as claimed in claim 1, wherein the downstream end of the underwater flow-line pipe is flexible.

3. The connecting method as claimed in claim 1, further comprising, between step a) and step b), guiding the connection end piece through the anchoring support and there bringing the connection end piece into the position oriented in a direction away from the sea bed.

4. The connecting method as claimed in claim 3, wherein the guiding of the connection end piece through the anchoring support is in an oblique direction between a first position at a first distance from the sea bed and a second position at a second distance from the sea bed and in the second position, the connection end piece extends in the position oriented in a direction away from the sea bed, the first distance being greater than the second distance.

5. The connecting method as claimed in claim 1, further comprising applying pressure to the anchoring support for driving the connection end piece in motion toward the connector.

6. A connection facility configured for connecting an underwater flow-line pipe stretched out on a sea bed for transporting a hydrocarbon with an underwater riser oriented toward a sea surface situated vertically above the sea bed,
  the underwater riser having an upstream end ending in a connector;
  the underwater flow-line pipe having a downstream end which includes a connection end piece;
  the connection end piece extending away from the sea bed and the connector being spaced from and extending facing the connection end piece, wherein the facility comprises:
  an anchoring support configured to be installed on the sea bed and configured for holding both of the upstream end and the downstream end;
  a drive device configured to drive the connection end piece translationally toward the connector enabling the connector and the connection end piece to be connected to each another; and
  a holding member for directly holding the upstream end so that the connector of the upstream end is in a fixed position with respect to the anchoring support.

7. The connection facility as claimed in claim 6, wherein the downstream end of the underwater flow-line pipe is flexible.

8. The connection facility as claimed in claim 6, wherein the anchoring support comprises a receiving frame configured to receive the connection end piece when the connection end piece presses against the receiving frame.

9. The connection facility as claimed in claim 8, wherein the receiving frame comprises guide members configured for guiding the connection end piece towards a position thereof oriented in a direction away from the sea bed.

10. The connection facility as claimed in claim 9, wherein the guide members are positionable for the guiding of the connection end piece and are also retractable away from the connection end piece.

11. The connection facility as claimed in claim 9, wherein the drive device is mounted on the guide members.

12. The connection facility as claimed in claim 6, wherein the drive device comprises hydraulic cylinders.

\* \* \* \* \*